United States Patent Office 2,726,172
Patented Dec. 6, 1955

2,726,172

TREATING VIALS WITH SILICONE

Robert R. Bennett, Terre Haute, Ind., and Henry F. Enos, Peoria, Ill., assignors to Commercial Solvents Corporation, Terre Haute, Ind., a corporation of Maryland No Drawing. Application August 20, 1954,
Serial No. 451,288

5 Claims. (Cl. 117—95)

Our invention relates to drain-clear containers and more particularly it relates to a method for imparting drain-clear properties to containers by treating same with silicone.

Silicone treatment of pharmaceutical and other type containers is known in the art, the treatment of pharmaceutical containers to give them drain-clear properties being disclosed in U. S. Patent 2,504,482, by Robert Goldman. One method described in this patent for treating pharmaceutical containers with silicone to render them drain-free consists essentially of dissolving a silicone in an organic solvent such as chloroform or ether and introducing the solution into a container which is to be treated. The solution is then drained out of the container, leaving a film thereof on the inner walls of the container and the solvent in this film is then permitted to evaporate. Generally, it is desired to evaporate the solvent and heat treat the residual film of silicone to bake the same, it being believed that the silicone layer is molecularly fused to the walls of the container, particularly when the container is glass.

Another method described in U. S. Patent 2,504,482, for coating the interior surface of a container consists essentially of exposing the interior surface of the container to moisture and then while the inside of the container is still moist, introducing a vapor of methylchlorosilane as a pure or substantially pure gas to the interior of the container. The absorbed moisture in the glass reacts with the methylchlorosilane to liberate methylsilicone which forms as a thin layer on the interior surface of the container, hydrogen chloride being formed as a by-product. The above methods and all other previously known methods for treating containers with silicone to render them drain-clear are inconvenient, time consuming, and very wasteful of materials as can readily be seen. According to one of the above methods, each container to be treated has to be rinsed out with a solution of silicone and organic solvent, the solvent in the residual film being then evaporated, after which the remaining silicone layer can be baked on the surface of the container. In such a method, care must be taken to employ non-flammable solvents, a portion of the solvent is lost with each treatment and several manipulative operations are involved. In the other of the above-described methods, a vapor is introduced to the interior of the container to be treated and a toxic, vaporous by-product is given off. Such a method is particularly inconvenient because of the great care that must be taken to collect and discard the hydrogen chloride evolved.

We have now discovered a method for treating containers with silicone to give them drain-clear properties which is simple, convenient, and economical. Our new process involves only one overall step which is conveniently and simply carried out, our new process also giving a uniform and highly satisfactory silicone film on the containers treated. Our new method also makes it possible to apply an exceedingly thin film to the surface of the containers being treated, such film being highly satisfactory and because of the thickness and uniformity thereof, the containers treated according to our new method can be affixed with most kinds of labels.

Our new process consists essentially of applying the vapor of a polysiloxane i. e. silicone, to the surface of a container to which it is desired to impart drain-clear properties, the application of the vapor to the surface of the container being conducted at an elevated temperature sufficient to bake a thin film of silicone on the surface of the container. By carrying out our invention as will be hereinafter described, we are able to treat a large number of containers to which it is desired to impart drain-clear properties in a single, relatively simple operation.

The organo-polysiloxane which we employ in our new process has the following formula:

$$Si_nO_{n-1}R_{2n+2}$$

where $n$ is an integral number and R is an alkyl or aryl group or combination thereof. The alkyl groups which may be employed include methyl, ethyl, propyl, butyl, pentyl, hexyl, heptyl, octyl, decyl, etc. Examples of the aryl group include phenyl, tolyl, naphthyl, etc. Generally, we prefer to employ polysiloxane materials wherein R is methyl since they are readily available commercially and since very satisfactory results can be obtained employing such polysiloxane materials. As well known in the art, the polysiloxanes represented by the above formula are compounds made up of a chain having alternate silicon and oxygen atoms, the hydrocarbon groups being attached to the silicon atoms in the chain. Such polysiloxane materials range in chain length from a compound containing two silicon atoms and one oxygen atom to compounds having many silicon and oxygen atoms therein. It is common in the silicone field to identify the various polysiloxane materials of different chain lengths by their viscosity, the viscosity increasing with increased chain lengths.

In our new process, we employ polysiloxane materials which are fluid at ordinary temperatures and which vaporize upon heating to temperatures which are not commercially unfeasible to obtain. We have found that polysiloxane materials having viscosities ranging from about 5 to about 1,000 centistokes are very satisfactory in meeting the above requirements and for accomplishing the desired results. We prefer to employ a polysiloxane fluid having a viscosity of about 100 centistokes, our best results being accomplished with material of this type.

The amount of polysiloxane fluid which we employ in our process depends on the amount of surface to be coated and the size of the vessel in which the containers to be coated are placed for treatment. The larger the surface to be coated the more polysiloxane fluid will be required and the larger the vessel in which the containers are placed for treatment, the more polysiloxane fluid will be required to coat a given amount of surface. Such determinations are within the skill of the art and need no further discussion here.

As indicated above, we can operate our process to treat a large number of containers to impart drain-clear properties thereto at one time. For example, when treating containers for aqueous liquid pharmaceutical preparations, we can place the containers in an inverted position in a closed vessel containing the polysiloxane fluid and heat the vessel at a temperature ranging from about 200 to 350° C. for a period of about 4 to 8 hours, a hard, transparent silicone film being thus formed on the internal and external surfaces of the treated containers. We have found that if we employ a flat, tray-type vessel 11 inches wide, 29½ inches long and 2⅞ inches deep capable of holding approximately 400 vials having a capacity of 7.5 ml., said vials being commonly employed in the pharmaceutical industry, we can satisfactorily coat all of the vials with a hard, thin, transparent silicone film both inside and out by placing only one ml. of a polysiloxane i. e. a methyl silicone, having a viscosity of 100 centistokes in the tray and then heating the tray full of vials at a temperature of about 250° C. for a period of about 6 hours. The above procedure can be employed to treat about 375 vials having a capacity of 14.5 ml., about 250 vials having a capacity of about 17.5 ml., about 200 vials having a capacity of about 24 ml. and about 115 vials having a capacity of about 60 ml. In employing the above-described method for coating containers to impart drain-clear properties thereto, we prefer to place a screen in the bottom of the tray-type vessel, the containers to be treated being then placed in an inverted position on the screen.

Since the hard silicone film which is baked onto the treated containers is transparent, the best method of determining results obtained is to observe the drain-clear properties of the treated container. Thus, the treated containers can be filled with the intended product and the product then poured out of the container, an observation of the drain-clear properties being made.

It is, of course, obvious that different products have different properties insofar as their drain-clear tendencies are concerned. Thus, an aqueous suspension of procaine penicillin will drain clear from a vial treated as described above when a silicone fluid having a viscosity of 100 centistokes is employed but will not drain clear from the vial if a silicone fluid having a viscosity of 5 centistokes is employed. On the other hand, when the vial is to be filled with an aqueous preparation of procaine penicillin and potassium penicillin in a ratio of 3 units of procaine penicillin to 1 unit of potassium penicillin, satisfactory drain-clear properties can be obtained by treating the vials as above employing a polysiloxane fluid having a viscosity of only about 5 centistokes.

A further and very important advantage of our new process for treating containers with silicone to impart drain-clear properties thereto lies in the fact that while the external surfaces of the containers are in most instances also treated with the silicone film, we have found that we can satisfactorily adhere most types of labels or the like to the surface of the container.

It is apparent that many variations in our process will be obvious to those skilled in the art; however, we intend to include within the scope of this application all such obvious equivalents, being not limited to the partcular proportons, procedures, materials, etc. described above.

Now having described our invention, what we claim is:

1. A process for coating containers with a thin, transparent, silicone film which comprises vaporizing a polysiloxane fluid in a closed vessel containing the containers to be treated and maintaining the vessel at a temperature and for a length of time sufficient to impart a thin, hard silicone film on the surface of the containers.

2. A process for coating containers with a thin, hard silicone film which comprises vaporizing a polysiloxane fluid having a viscosity ranging from about 5 to about 1,000 centistokes in a vessel containing the containers to be treated and holding the vessel at a temperature and for a length of time sufficient to impart a thin, hard silicone film on the surface of the containers.

3. A process for coating containers with a thin, hard silicone film to impart drain-clear properties thereto which comprises vaporizing a polysiloxane fluid having a viscosity ranging from about 5 to about 1,000 centistokes in a closed vessel wherein are placed the containers to be treated and holding the vessel at a temperature ranging from about 200 to about 350° C. for a period of time sufficient to impart a thin, hard silicone film on the surface of the containers.

4. A process for coating containers with a thin, hard silicone film to impart drain-clear properties thereto which comprises vaporizing a polysiloxane fluid having a viscosity ranging from about 5 to about 1,000 centistokes in a closed vessel wherein are placed the containers to be treated and holding the vessel at a temperature ranging from about 200 to about 350° C. for a period ranging from about 4 to 8 hours.

5. A process for coating containers with a thin, hard silicone coating to impart drain-clear properties to the container which comprises placing the containers to be treated in an inverted position in a closed vessel containing a polysiloxane fluid having a viscosity ranging from about 5 to about 1,000 centistokes and heating the closed vessel at a temperature ranging from about 200 to about 350° C. for a period ranging from about 4 to about 8 hours.

No references cited.